Feb. 24, 1953     J. W. CHAMBERLIN     2,629,245
RECIPROCATING WASHER AND CENTRIFUGAL DRIER PROVIDED
WITH SHOCK ABSORBING HYDRAULIC SUSPENSION ASSEMBLY
Filed Nov. 29, 1946     2 SHEETS—SHEET 1

INVENTOR
JOHN W. CHAMBERLIN
BY M. W. Green
ATTORNEY

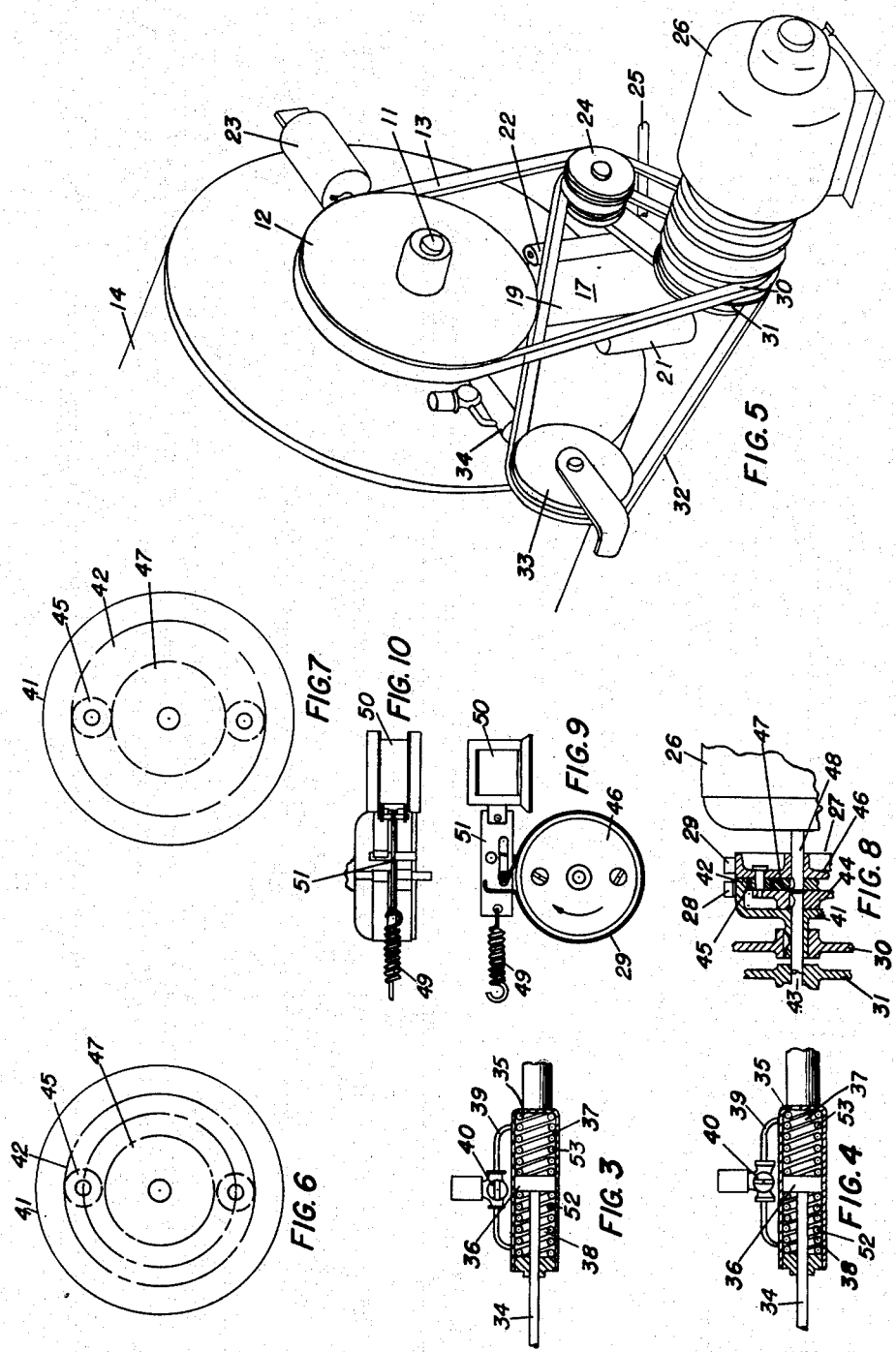

Patented Feb. 24, 1953

2,629,245

UNITED STATES PATENT OFFICE 2,629,245

RECIPROCATING WASHER AND CENTRIFUGAL DRIER PROVIDED WITH SHOCK ABSORBING HYDRAULIC SUSPENSION ASSEMBLY

John W. Chamberlin, Mequon, Wis., assignor, by mesne assignments, to Avco Manufacturing Corporation, New York, N. Y., a corporation of Delaware Application November 29, 1946, Serial No. 713,191

5 Claims. (Cl. 68—24)

This invention relates to textile washing and extracting mechanism and more particularly to a combined machine capable of both washing and centrifugal drying in the same unit.

It is a primary object of the present invention to provide a combined washing and extracting machine of the type embodying a clothes cylinder mounted on a horizontal axis with mechanism to oscillate the cylinder in a substantially horizontal direction for the purpose of producing a washing action together with mechanism to rotate the cylinder at relatively high speed for the purpose of extracting the washing liquid from the contained clothing.

It is a further object to provide mounting structure which affords resilient support to the washing machine and absorbs much of the vibration caused by out of balance loads during the high speed rotation of the cylinder for extraction.

It is another object to provide a washing machine with mechanism whereby the transition from oscillation to rotation may be accomplished by a minimum of operating controls.

Still another object is to provide a washing machine with a clothes containing cylinder which has an opening capable of receiving clothes at one end and which is provided with resilient support at the opposite end for effecting oscillation and rotation.

The above and other objects of the invention will appear more fully from the following more detailed description and by reference to the accompanying drawings forming a part hereof and wherein:

Figure 3 is a cross section of the oscillating strut with the solenoid valve open and permitting the piston to move freely during high speed extracting operation.

Figure 4 is a view similar to Figure 3 but with the solenoid valve in a closed position such that the piston is stationary and rotation of the crank pulley will result in reciprocation of the tub.

Figure 5 is a perspective view showing the back of the machine and the general arrangement of the two drives, one for reciprocation and the other for rotation.

Figure 6 is a diagrammatic view showing the relative rotation of the clutch gears during reciprocation operation.

Figure 7 is a diagrammatic view showing rotation of the clutch gear during high speed extraction operation.

Figure 8 is a longitudinal sectional view through the clutch and drive shaft assembly.

Figure 9 is a cross section through the clutch showing one of the clutch bands and the operating means therefor.

Figure 10 is a top view of Figure 9.

Figure 2:
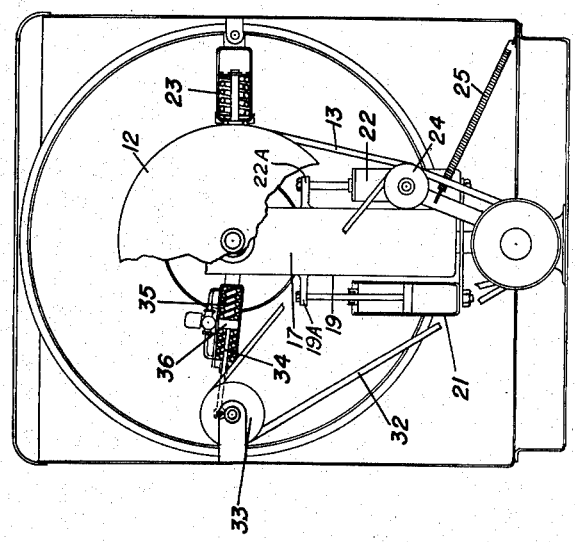
Figure 2 is a rear view of the machine showing the mechanism for reciprocation and centrifugal extraction.

A cylinder 10 in which the clothes are to be placed for washing is mounted on a horizontal drive shaft 11 which shaft is driven by a pulley 12 and belt 13 in such a manner as to cause the cylinder to rotate. A tub 14 encloses the cylinder, with the shaft 11 and its housing 15 being connected to the tub by a rubber gasket 16 in order to seal the tub 14 and to enable cylinder 10 to rotate inside the stationary tub 14.

Figure 1:
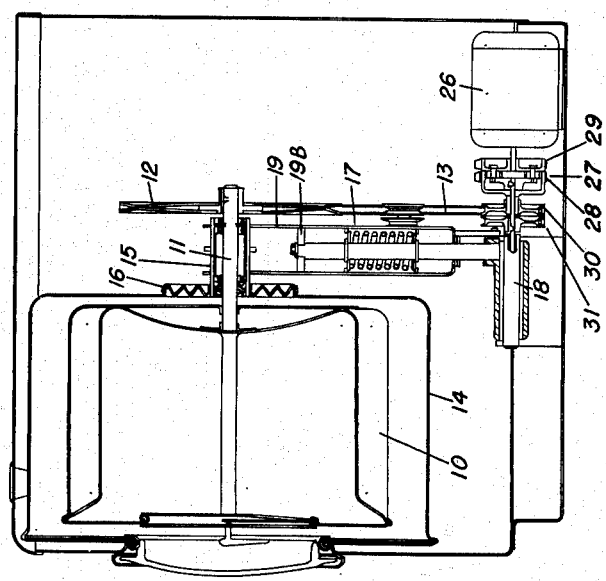
Figure 1 is a vertical section through a washing machine showing the tub and driving means for the cylinder.

A suspension assembly 17 extends from the shaft 11, which it supports together with the cylinder 10, to a pivotal support shaft 18 at the base of the washer. This assembly is made up of a center supporting member 19 to which are attached the two vertical stabilizers 21 and 22. The center supporting member 19 as well as the vertical stabilizers 21 and 22 are shock absorbers of the pneumatic type, and as may be seen by reference to Figures 1 and 2, the center supporting member 19 is designed with a piston member 19B extending upward from the support shaft 18 thereby to absorb motion in a downward direction; whereas the vertical stabilizers 19 and 22 are provided with piston members extending downwardly from lugs 19a and 22a mounted on the center supporting member 19 thereby to resist upward movement of the unit. Such an arrangement provides for resilient vertical support and enables the entire assembly to oscillate freely about the axis of the support shaft 18. In order to resiliently resist the reciprocating movement of the shaft 11 which is made possible by the movement of the suspension assembly 17 about the pivotal shaft 18, a centering strut 23 is provided.

At the bottom of the machine a motor 26 drives a planetary gear assembly 27 which is equipped with two clutch bands 28 and 29. As is more fully described hereinafter the actuation of one of these clutch bands 28 causes the rotation of the cylinder 10 by first setting in motion the pulley 30 which through the belt 13 causes the pulley 12 to rotate the shaft 11. The belt 13 also passes over the idler sheave 24 which is continuously pulled outward by the tension spring 25 and which therefore acts as a belt tightener.

The actuation of the other clutch band 29 is designed to provide a reciprocating movement of cylinder 10. This is accomplished by the rotation of a pulley 31 which, through a belt 32, rotates a crank pulley 33 as shown in Figure 2. The crank pulley is equipped with a connecting rod 34 which is connected with the suspension assembly 17 and imparts to it a reciprocating motion. The connecting rod 34 has both a cylinder portion 35 and a piston portion 36. As is illustrated in Figures 3 and 4 two liquid filled chambers 37 and 38 are provided in the cylinder portion on opposite sides of the piston, and these chambers are connected by a conduit 39 controlled by a solenoid operated valve 40. Figure 3 shows the solenoid valve 40 open permitting a metered flow of liquid between chambers 37 and 38 and leaving the piston 36 free to reciprocate so that the rotation of the crank pulley will not cause the suspension assembly 17 or the cylinder to reciprocate. This result is further assured by the centering strut assembly 23 whose normal function is to hold the assembly in a central position. However, if the solenoid valve 40 is closed as it is in Figure 4, the interchange of liquid between the chambers 37 and 38 through the conduit 39 is stopped and the piston remains stationary inside the cylinder, thus causing the connecting rod to become one rigid piece, and causing the top of the suspension assembly 17 to reciprocate when the pulley 33 is rotated. A constant length for the reciprocating stroke is insured by the centering springs 52 and 53 inside the cylinder portion of the connecting rod, and on opposite sides of piston 36, which springs cause the piston to come to rest in the correct position after rotation.

As is shown in Figures 8, 9 and 10 the transmission is a planetary type having a clutch spider 41 which carries a ring gear 42 and rotation of said spider causes rotation of the pulley 30 which as previously mentioned causes rotation of the cylinder 10 for centrifugal extraction. The pulley 31, the rotation of which as previously mentioned, causes oscillation of the cylinder through the belt 32 and the crank pulley 33 is rotated through a shaft 43 which carries a drive disk 44 and this disk acts as a carrier for the pinion gears 45. The drive disk 44 and pinion gears 45 also rotate with a clutch disk 46. The drive motor 26 drives a gear 47 through its shaft 48. The drive gear 47 as shown in Figures 6 and 7 is a sun gear of a planetary gear train and meshes with previously mentioned pinion gears 45 which pinion gears mesh in turn with ring gear 42. On the outside of the transmission there are two clutch bands 28 and 29. The clutch band 28 surrounds the clutch spider 41 and the clutch band 29 surrounds the clutch disk 46. As shown in Figures 9 and 10 the clutch bands 28 and 29 are controlled by a spring 49 and a solenoid 50. When the solenoid 50 is not actuated the spring 49 pulls operating link 51 towards the left as shown in Figure 9 and causes the clutch band 29 to be contracted to grip the clutch disk 46. However, when the solenoid is actuated as shown in Figure 9 the link 51 is moved towards the right and the clutch band 28 is gripped against the clutch spider 41 to hold it against rotation. Therefore, in operation when the clutch band 28 is contracted by actuation of the solenoid 50 the clutch spider 41 will be held in a stationary position and the rotation of the motor shaft 48 will cause the drive gear 47 to be rotated which will rotate the pinion gears 45 and cause said pinion gears to rotate on the ring gear 42 which is stationary and thereby result in a rotation of the drive disk 44 and the shaft 43 which carries with it the oscillating pulley 31. However, when the solenoid is not actuated the opposite clutch band 29 is contracted to grip the clutch disk 46. Such result will cause the pinion gears 45 to remain stationary and the rotation of the drive gear 47 will cause the clutch spider 41 to rotate which will carry with it the pulley 30 for rotating the cylinder for spinning or centrifugal extraction.

It is therefore apparent that if controls are provided to actuate the transmission assembly at the bottom of the machine and also for the solenoid valve 40, that the machine may be operated selectively either in the reciprocating or rotating cycle. During the reciprocating cycle the clothes cylinder 10 is caused to reciprocate back and forth in a horizontal plane. This reciprocating movement is resiliently resisted by the centering strut 23, which is provided with a spring of sufficient resiliency to enable it to be flexed by the reciprocation of the suspension assembly 17 but which is of sufficient strength to cause the suspension assembly 17 to be centered when the reciprocation ceases. The horizontal reciprocation of the machine agitates the clothes and washing fluid in such a manner that the clothes are rubbed against the baffles and the interior surfaces of the clothes cylinder 10. This friction between the clothes and the interior of the washing cylinder 10 as well as the movement of the washing fluid which enters the cylinder through the numerous perforations therein produces a washing action which is very efficient and likewise very economical of water and soap.

Upon completion of the washing and rinsing (reciprocating) cycle the suspension assembly is automatically centered by the centering strut 23, the water is drained from the tub 14 and the machine is then operated in the rotating or spinning cycle for extracting the water from the contained clothes by operation of suitable controls for bands 28 and 29 and valve 40. The clothes cylinder 10 is rotated at a sufficiently high speed to utilize centrifugal force to remove the water from the clothing through the perforations in the cylinder. The vibration and torque resulting from the high speed rotation of the clothes cylinder is largely absorbed by the two vertical stabilizers 21 and 22 and in the horizontal direction by the centering strut 23 and the connecting rod unit 34 which now acts as a shock absorbing unit due to oil transfer through valve 40. Any slack in the belting which might be caused by the movement of the suspension assembly 17 about the pivotal support 18 is taken up by the idler sheave 24 over which the belts 13 and 32 run.

Thus it can be seen that this invention combines the advantages of reciprocating washing action along with a high speed rotational spin for extraction.

While one particular machine and its operation have been described in detail, it is not intended to limit the scope of the invention by that description or otherwise than by the terms of the appended claims.

I claim:

1. In a combined washing and extracting machine embodying a clothes containing cylinder mounted for rotation upon a shaft, means to rotate said cylinder at high speed for centrifuging action, a suspension assembly supporting said cylinder and shaft, a crank pulley positioned at the side of said cylinder, a connecting rod having one end thereof attached to said crank pulley and the other end thereof attached to said suspension assembly, said connecting rod comprising a liquid filled cylinder portion and a piston portion with said piston dividing said liquid filled cylinder into two chambers, a conduit which connects said chambers, a valve located on said conduit, means to close the valve to stop the flow of liquid in said cylinder from one of said chambers to the other of said chambers thereby causing said piston to remain stationary and causing the connecting rod to become rigid to act as an oscillating member, means to open said valve to permit the liquid to flow from one of said chambers to the other, thereby permitting the piston to move in said cylinder and enabling said connecting rod to be variable in length to act as a shock absorber during the rotation of said cylinder.

2. In a combined washing and extracting machine of the character described, a clothes receiving cylinder mounted for rotation on a substantially horizontal shaft, a vertically extending resilient suspension assembly supporting said cylinder and said shaft in horizontal position for limited vertical movement, a crank pulley positioned adjacent one side of said cylinder, a connecting rod having one end thereof attached to said crank pulley and the other end thereof attached to said suspension assembly, said connecting rod having a liquid filled cylinder portion and a piston portion, means to prevent movement of liquid in said cylinder portion thereby to substantially rigidly connect said crank pulley and said suspension assembly when said cylinder is oscillated for washing, and means to allow movement of liquid in said cylinder portion during rotation of said cylinder for extraction thereby to arrange said connecting rod to operate as a shock absorber for lateral loads.

3. In a combined washing and extracting machine of the character described, a clothes receiving cylinder mounted for rotation on a substantially horizontal axis, a vertically extending resilient suspension assembly supporting said cylinder in horizontal position for limited vertical movement, a crank pulley positioned adjacent one side of said cylinder, rod means having one end thereof attached to said crank pulley and the other end thereof attached to said suspension assembly, electrically controlled hydraulic means to arrange said rod means to operate as a rigid connecting member for oscillation of said cylinder, and said electrically controlled hydraulic means adapted to arrange said rod means to operate as a shock absorbing member during rotation of said cylinder for extracting.

4. In a combined washing and extracting machine of the character described, a clothes receiving cylinder, means to rotate said cylinder at high speed for extraction, a vertically extending resilient suspension assembly supporting said cylinder in horizontal for limited vertical movement, a crank pulley positioned adjacent one side of said cylinder, a rod connecting said crank pulley to said suspension assembly, said rod having two liquid containing cylinder portions and a piston portion, a conduit interconnecting said liquid containing cylinder portions, and a valve adapted to control the rigidity of said rod by closing and opening said conduit, whereby said rod is arranged to operate as an oscillating member for said cylinder on closing of said conduit, and whereby said rod is arranged to operate as a shock absorber for said cylinder when said valve is open.

5. In a combined washing and extracting machine of the character described, a clothes receiving cylinder mounted for rotation on a substantially horizontal axis, a vertically extending resilient suspension assembly supporting said cylinder in horizontal position for limited vertical movement, a crank pulley positioned adjacent one side of said cylinder, a rod connecting said crank pulley to said suspension assembly, said rod having fluid containing cylinder portions and a piston portion, means adapted to selectively allow or prevent movement of fluid in said cylinder portions thereby to selectively allow or resist movement of said piston portion therein, and resilient means within said cylinder portions adapted to urge said piston portion to assume a position substantially centrally of said cylinder portions.

JOHN W. CHAMBERLIN.

REFERENCES CITED

The following references are of record in the file of this patent:

UNITED STATES PATENTS

| Number | Name | Date |
|---|---|---|
| 408,791 | Cairns | Aug. 13, 1889 |
| 408,797 | Cronk | Aug. 13, 1889 |
| 781,732 | McFarlane | Feb. 7, 1905 |
| 816,058 | Andree | Mar. 27, 1906 |
| 1,436,680 | Power | Nov. 28, 1922 |
| 2,396,105 | Kirby | Mar. 5, 1946 |
| 2,510,836 | Russell | June 6, 1950 |
| 2,526,048 | Russell | Oct. 17, 1950 |

FOREIGN PATENTS

| Number | Country | Date |
|---|---|---|
| 195,782 | Germany | May 7, 1907 |